May 22, 1951 R. A. MINZNER 2,554,469

DIRECT CURRENT LEVEL CHANGER FOR DIRECT COUPLED AMPLIFIERS

Filed Sept. 14, 1945

INVENTOR
RAYMOND A. MINZNER

BY Ralph L Chappell

ATTORNEY

Patented May 22, 1951 2,554,469

UNITED STATES PATENT OFFICE 2,554,469

DIRECT CURRENT LEVEL CHANGER FOR DIRECT COUPLED AMPLIFIERS

Raymond A. Minzner, Watertown, Mass., assignor, by mesne assignments, to the United States of America as represented by the Secretary of the Navy Application September 14, 1945, Serial No. 616,417

3 Claims. (Cl. 179—171)

My invention relates in general to the field of electron tube amplifiers and more particularly to those classified as D. C. or direct coupled amplifiers.

A direct coupled amplifier is one in which the plate of one stage is connected to the grid of a following stage either directly or through a resistor, battery or combination of the two. A blocking capacitor is not used in the coupling circuit, so that ordinarily the control grid is substantially at the D. C. level of the preceding plate circuit. An amplifier arrangement of this type is capable of amplifying direct or alternating voltages, and with proper design precautions may be operated with uniform amplification and phase shift down to zero frequency. The high frequency response, of course, is limited by shunting capacitance as in the more conventional resistance-capacitance coupling.

The elimination of a blocking or coupling capacitor between a first stage and a second stage presents numerous problems, particularly insofar as obtaining potentials for the second stage is concerned. Thus if the grid of the second stage is at the direct voltage level of the plate of the first stage, it is necessary to place the cathode of the second stage at a positive potential, higher than the plate potential of the first stage, so that a relatively negative bias may be obtained between grid and cathode. In turn this dictates a higher plate potential for the second stage than the first, with the result, that high voltage power supplies while undesirable are ordinarily encountered in direct coupled amplifier applications.

The problem of supplying the operating potentials for a direct coupled amplifier having a plurality of stages has been given considerable attention. For example, it has heretofore been a practice to utilize a single high potential positive power supply and a tapped resistance bleeder connected across this supply for obtaining the successively higher potentials, as required by the succession of amplifier stages. The disadvantage of this system has been the isolation of all stages but the first from ground potential, and the comparatively high direct voltage level of the output signals. All previous attempts to reduce the direct voltage level between the plate of one stage and the grid of the succeeding stage by a voltage dropping resistor had the inherent disadvantage of a loss in signal voltage proportional to the reduction in coupling voltage level. Systems utilizing batteries or power supplies for voltage level changing have been proposed, but have involved the use of a prohibitive number of these circuit components.

My invention contemplates a direct coupled amplifier circuit having a plurality of electron amplifier tube stages wherein the direct voltage level between stages is reduced to a practical, operative value without attenuation of the signal to be amplified and without high voltage power supplies isolated from ground potential.

In accordance with the principles of my invention, the amplified signal output of a first amplifier stage is directly coupled to the grid of a following stage with a large, predetermined and adjustable change in direct voltage level, and without change in the magnitude of the signal voltage transferred. The coupling circuit used to accomplish this comprises, basically, a single resistor and a constant current source connected to the grid of the succeeding amplifier stage.

It is therefore an object of my present invention to provide a multi-stage direct coupled amplifier circuit wherein the coupling voltage level between the output of one stage and the input of the succeeding stage is reduced without effect upon the desired signal to be transferred.

It is another object of my invention to provide an interstage coupling circuit for a direct coupled amplifier which functions to lower the coupled direct voltage level by a predetermined amount while the signal to be amplified remains unaffected.

A further object of my invention is to provide a multi-stage direct coupled amplifier circuit wherein all stages may be operated from a common, normal voltage power supply eliminating the progressive direct voltage rise previously encountered in the stages of an amplifier of this type.

A still further object of my present invention is to provide a grid biasing circuit comprising the series combination of a fixed resistor and a constant current source of adjustable output current.

These and other objects of my invention will now become apparent in the following detailed specification taken in connection with the accompanying drawings in which.

Figure 1:
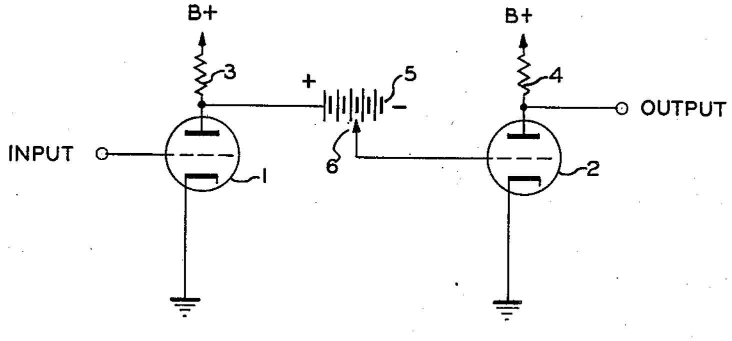
Fig. 1 is a simplified schematic diagram of a conventional direct coupled amplifier circuit.

In Fig. 1 there is illustrated a basic two-stage direct coupled amplifier circuit comprising the triode electron tubes 1 and 2. The cathodes of amplifiers 1 and 2 are grounded and the plates thereof are connected to a common source of positive potential through load resistors 3 and 4 respectively. A voltage fluctuation of any frequency whatsoever when impressed upon the grid of triode 1 will cause a corresponding but amplified voltage fluctuation in the plate circuit thereof. The amplified signal voltage appearing across the plate load circuit of triode 1 is coupled to the control grid of the succeeding stage, that is, triode 2. If direct coupling were used, that is to say, if the grid of triode 2 were attached directly to the plate of triode 1 the voltage level upon this grid would be approximately equal to the difference between the power supply voltage used in connection with the amplifier 1 and the steady drop across load resistor 3. Such a connection would preclude grounding the cathode of tube 2, which instead would have to be operated at a voltage somewhat higher than this power supply voltage. In turn the plate of triode 2 would require a more positive supply than the plate of tube 1. In order to ground the cathode of triode 2 so as to obtain a uniform reference level for all amplifier stages it has been necessary, as illustrated, to couple the plate of triode 1 to the control grid of triode 2 through a battery 5, the more negative terminal of which is connected to the grid. This arrangement subtracts a fixed potential from the signal coupled from the first to the second stage, and if this battery 5 is sufficiently large the grid of tube 2 may be operated negatively as is generally required for successful linear amplification. In order to change the coupling reference voltage level, it is necessary to change the grid tap 6 on the battery 5. The system illustrated in Fig. 1 is operative although impractical for a multi-stage direct coupled amplifier inasmuch as coupling batteries 5 would be required between all stages of amplification.

Figure 2:
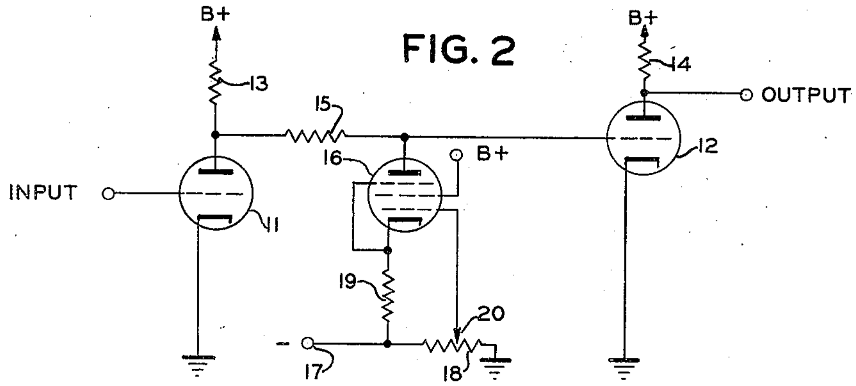
Fig. 2 is a schematic diagram of a two stage direct coupled amplifier utilizing a coupling circuit of novel design.

In Fig. 2 there is illustrated a preferred method for accomplishing the potential level change from the plate of the first tube to the grid of the second tube 2 without the use of a separate battery 5. As described in connection with Fig. 1, the direct coupled amplifier simply comprises triodes 11 and 12, the cathodes of which are grounded and the plates thereof returned to a common source of positive potential through load resistors 13 and 14 respectively. A signal input upon the control grid of electron tube 11 will appear as a correspondingly amplified signal at the plate thereof. The interstage coupling circuit comprises in accordance with my invention a resistor 15 in series with a constant current regulator or source generator comprising a pentode electron tube 16. The control grid of the second amplifier stage 12 is connected to the junction between the resistor 15 and the constant current source 16, which for the particular embodiment illustrated comprises the junction between resistor 15 and the plate of pentode 16.

It is well understood in the art that the plate current of a pentode electron tube amplifier is substantially independent of plate voltage fluctuations over a wide range, provided that the screen grid and control grid voltages are constant. The pentode 16 in Fig. 2 is connected for constant current operation and is operated negative with respect to ground. Thus a negative power supply, the output of which appears between terminal 17 and ground, is shunted by a potentiometer 18. The cathode of pentode 16 is returned through cathode resistor 19 to the most negative point, terminal 17. The control grid is connected to a negative voltage source through the variable tap 20 on the potentiometer 18, and the screen grid of pentode 16 is connected to a voltage source positive with respect to cathode. The suppressor grid thereof is tied directly to cathode. The plate of the pentode connects to the positive voltage source used for amplifier plate voltage through the resistors 15 and 13 and accordingly, pentode plate current flows from terminal 17 up through cathode resistor 19, developing a bias for the tube, and through resistors 15 and 13 to the positive power supply terminal. For a particular setting of the tap 20 upon the potentiometer 18, the pentode 16 provides a stable, constant value of plate current. This current flow results in a voltage drop across resistor 15 which is relatively negative with respect to ground at the plate of pentode 16 and positive at the plate of triode 11. It is this potential drop across resistor 15 which lowers the potential level in coupling from the plate of triode 11 to the grid of triode 12.

The magnitude of the potential drop across resistor 15 is of course dependent upon the value of pentode plate current and the size of resistor 15. The magnitude of pentode plate current is adjustable, and determined by the pentode control grid potential. Since the cathode of pentode 16 is returned to a point negative with respect to ground the voltage drop across tube 16 is adjusted so that the plate potential thereof is negative with respect to ground by an amount equal to the necessary bias for the successful operation of triode 12. This bias is controllable by the variation of control grid bias on pentode 16.

Signal fluctuations appearing at the plate of triode 11 are coupled to the grid of triode 12 through resistor 15 and hence appear at the plate of pentode 16. In accordance with the principles of pentode operation hereinabove described, the fluctuations of pentode plate voltage will have substantially no effect upon the plate current flowing therethrough, so that the voltage drop across resistor 15 will not have a signal component. In this manner the coupling circuit illustrated transfers the entire signal from plate to grid while reducing the direct potential level to a value which establishes the proper operating grid bias upon the succeeding tube. Cathode resistor 19 introduces degenerative circuit action which stabilizes plate current flow. The amount of degeneration required is small since a pentode is inherently a constant current device.

Figure 3:
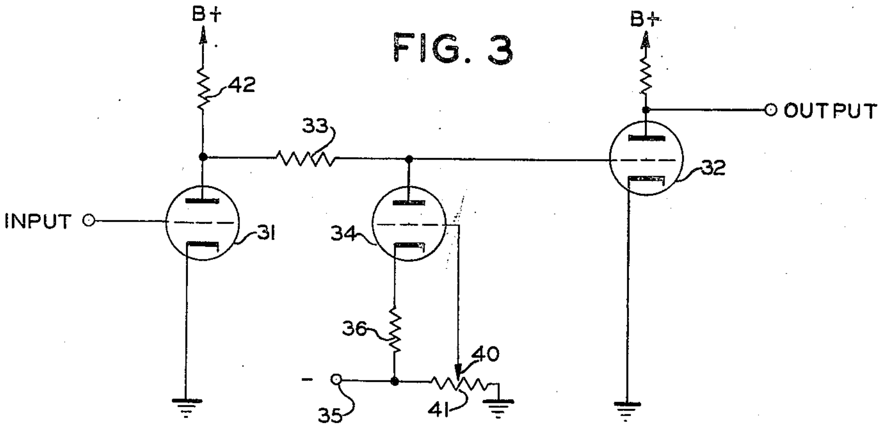
Fig. 3 is a schematic diagram of a two stage direct coupled amplifier circuit and is a modification of the circuit illustrated in Fig. 2.

In Fig. 3 there is illustrated another possible circuit, performing the electrical functions of the coupling circuit illustrated in Fig. 2. The amplifier as in Fig. 2, comprises two triodes 31 and 32, coupled by a resistor 33 and a coacting triode 34. As in the example of the pentode 16, the cathode of triode 34 is returned to a negative voltage source at terminal 35 through a cathode bias resistor 36. The control grid of the second amplifier stage 32 is connected to the junction between resistor 33 and the plate of triode 34. The triode grid is returned to the variable tap 40 of a potentiometer 41 shunting the negative power supply. Thus, triode current flows from the negative terminal 35 through cathode resistor 36, through the tube 34 and to the positive source of potential through series resistors 33 and 42. The triode tube 34 is made to operate as a constant current regulating tube and hence as a constant current source by the use of a particularly large amount of degeneration which is necessary because ordinarily plate voltage affects plate current. This is obtained by the resistor 36 which is of the order of one-half to one megohm.

As a constant current tube the signal voltage fluctuations at the plate thereof will have substantially no effect on the tube current, and the voltage drop across resistor 33 will comprise only the desired direct voltage for voltage level changing between stages. The negative bias with respect to ground that is applied to the control grid of triode 32 is variable and is readily adjusted by the variable tap 40 on potentiometer 41.

In the circuits illustrated in Figs. 2 and 3, a separate negative voltage tap is indicated as a cathode return for the constant current source. Actually this negative voltage supply may comprise the negative end of a resistance bleeder, shunting a conventional power supply, and grounded at some point between positive and negative ends thereof as determined by the desired positive and negative potentials. These figures also illustrate two possible constant current sources, namely properly operated pentode and triode electron tubes. However, as is well understood many other sources of adjustable constant current are available and may be substituted for those illustrated. It is also evident that the positive potential source may be utilized to supply plate voltage for all stages used in the amplifier and that the number of these stages is not limited to two as illustrated. In like manner the negative terminal, used for a cathode return for the constant current source may act as a common terminal for all amplifier coupling tubes employed.

Since numerous modifications and extensions of the principles outlined above will now become apparent to those skilled in the art, I prefer not to be limited by these specific disclosures but by the spirit and scope of the appended claims.

I claim:

1. A direct coupled amplifier comprising a first electron tube having a plate and a plate load circuit, a second electron tube having a grid and a cathode, said cathode being returned to a point of fixed reference potential, and means coupling said grid to said plate load circuit, said coupling means including a first resistor connected between said plate and said grid, a third electron tube having at least a plate, a grid and a cathode, said plate being directly coupled to said grid of said second electron tube, said cathode being coupled through a first resistor to a point more negative than said point of fixed reference potential, a potentiometer having an adjustable tap thereon connected between said point of fixed reference potential and said point of more negative potential, and means coupling said grid of said third electron tube to said adjustable tap.

2. A direct coupled amplifier comprising a first electron tube having a plate and a plate load circuit, a second electron tube having a grid and a cathode, said cathode being returned to a point of reference potential, a first resistor coupling said grid to said plate load circuit, and a constant current device connected between said grid and a point of potential more negative than said point of reference potential, said constant current device comprising a third electron tube having at least a plate, a cathode and a grid, said plate being coupled to said grid of said second electron tube, said cathode being coupled to said point of negative potential through a second resistor, a potentiometer having an adjustable tap thereon connected between said point of reference potential and said point more negative than said reference potential, and means coupling said grid of said third electron tube to said adjustable tap, said first resistor completely isolating said constant current device from said first electron tube and the plate load circuit associated therewith.

3. A direct coupled amplifier as in claim 2 wherein said third electron tube is a pentode tube operating in a range of substantially constant plate current for changes in plate to cathode voltage.

RAYMOND A. MINZNER.

REFERENCES CITED

The following references are of record in the file of this patent:

UNITED STATES PATENTS

| Number | Name | Date |
|---|---|---|
| 2,284,064 | Morgan | May 26, 1942 |
| 2,369,138 | Cook | Feb. 13, 1945 |